No. 859,539. PATENTED JULY 9, 1907.
C. C. BEEBE.
PROCESS OF MAKING RUBBER HEELS.
APPLICATION FILED FEB. 2, 1907.
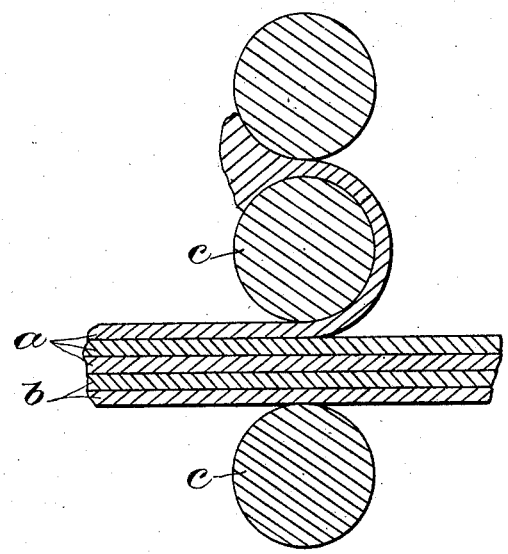
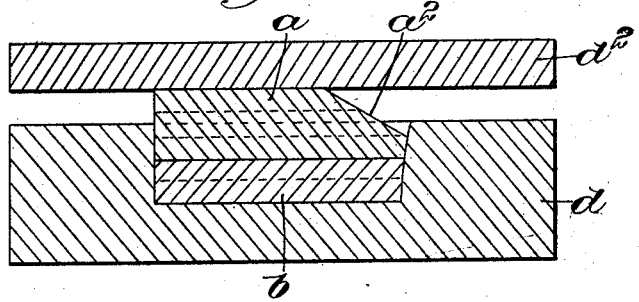
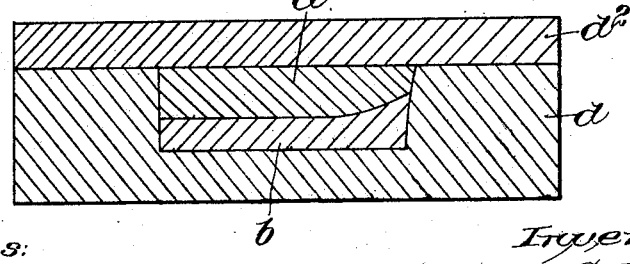
Witnesses:
Jas. J. Maloney.
G. H. Williams.
Inventor:
Charles C. Beebe,
by J. P. and H. J. Livermore
Attys.

UNITED STATES PATENT OFFICE.

CHARLES C. BEEBE, OF NORTH BROOKFIELD, MASSACHUSETTS, ASSIGNOR OF ONE-HALF TO THOMAS G. RICHARDS, OF NORTH BROOKFIELD, MASSACHUSETTS.

PROCESS OF MAKING RUBBER HEELS.

No. 859,539.      Specification of Letters Patent.      Patented July 9, 1907.

Original application filed November 30, 1906, Serial No. 345,637. Divided and this application filed February 2, 1907. Serial No. 355,520.

*To all whom it may concern:*

Be it known that I, CHARLES C. BEEBE, a citizen of the United States, residing in North Brookfield, in the county of Worcester and State of Massachusetts, have invented an Improvement in Processes of Making Rubber Heels, of which the following description, in connection with the accompanying drawings, is a specification, like letters on the drawings representing like parts.

The present invention relates to a process of producing rubber heels (being a division of application Serial No. 345,637, filed Nov. 30, 1906, rubber heel), and is embodied in a novel process of building up a heel made of two grades of rubber, the purpose being to provide the heel with a superior grade of rubber along the wearing or tread surface, and also to increase the quantity of the better grade where the greatest wear is encountered.

It is common, in building up heels of rubber, to unite layers of rubber under heat and pressure, and so long as the adjacent surfaces of the layers are flat and substantially plane, the layers are united and form a substantially solid, homogeneous mass. It is, however, impracticable to cause two pieces of rubber, whether of the same or of different qualities, to unite firmly, except while they are heated and being calendered under pressure. In order, therefore, to obtain the preponderance of better material along that portion of the tread surface where the wear is greatest, the heel, which is first made with the portions of the different grades of substantially uniform thickness throughout, is prepared for the final step of the process embodying the invention by skiving or beveling a portion of the inferior material along that part of the heel where the superior material is intended to be in excess. When, therefore, the heel thus prepared is forced into a mold, the skived or weakened portion of the inferior material will yield, and the superior material will flow into and fill the space thus afforded, so that in the finished heel the superior material will be re-enforced where needed.

Figure 1 is a diagram representation of a three-roll calender acting upon sheets of rubber to form the material from which heel blanks may be made: Fig. 2 is a sectional view of a heel prepared for the final molding process; and Fig. 3 is a view of the finished heel compressed in the mold.

While it is practicable to unite two single layers of different grades of rubber, it is usual to make up the heel blank of a number of layers calendered together, or otherwise united, Fig. 1 showing three layers $a$ of inferior rubber and two layers $b$ of the higher grade of rubber being forced between calender rolls $c$ to be united into a solid blank under heat and pressure. It is to be understood that, in this process, one layer is added at each operation, the drawing showing the final layer being added to the others which have been previously united. So far as relates to this step of the process, it is essential only that the inferior material $a$ and the superior material $b$ should be united during the calendering process with the material heated. In order to obtain the preponderance of superior material in the finished heel, the heel blank $a$, $b$, shown as cut approximately to the shape of the mold $d$, is further cut or skived, as indicated at $a^2$, so that a portion of the inferior material is removed, as indicated, along that part of the upper surface of the heel which corresponds to the part of the lower surface where the better material is to be re-enforced. When, therefore, the cover portion $d^2$ of the mold is forced into place, subjecting the heel blank to its final compression, the skived surface $a^2$ will be bent up into approximate contact with the upper member $d^2$ of the mold, thus creating an additional space along the bottom of the mold into which the superior rubber $b$ will flow, as indicated in Fig. 3. This flowing consists substantially in the displacement of the particles of superior rubber, and does not, in any way, strain or tend to tear the two layers of rubber apart.

It is to be understood that, in the drawings, the dotted lines indicating the division between the several layers of rubber and the full line indicating the adjoining surfaces of the two grades of material, are inserted for purposes of illustration only, since, in the actual product, no such lines will be visible.

Claim.

That improvement in the art of making rubber heels which consists in joining flat pieces of rubber differing in quality by means of pressure exerted uniformly along the adjoining surfaces, removing a portion of the inferior rubber along the free surface thereof, and finally subjecting the heel thus formed to pressure in a mold to render uniform the mutilated surface of the inferior material, and to cause the superior material to distribute itself in the mold accordingly.

In testimony whereof, I have signed my name to this specification in the presence of two subscribing witnesses.

CHARLES C. BEEBE.

Witnesses:
    JOS. P. LIVERMORE,
    M. E. COVENEY.